No. 803,782.  
PATENTED NOV. 7, 1905.
M. PETERSON.  
TRACTION WHEEL.  
APPLICATION FILED DEC. 27, 1904.
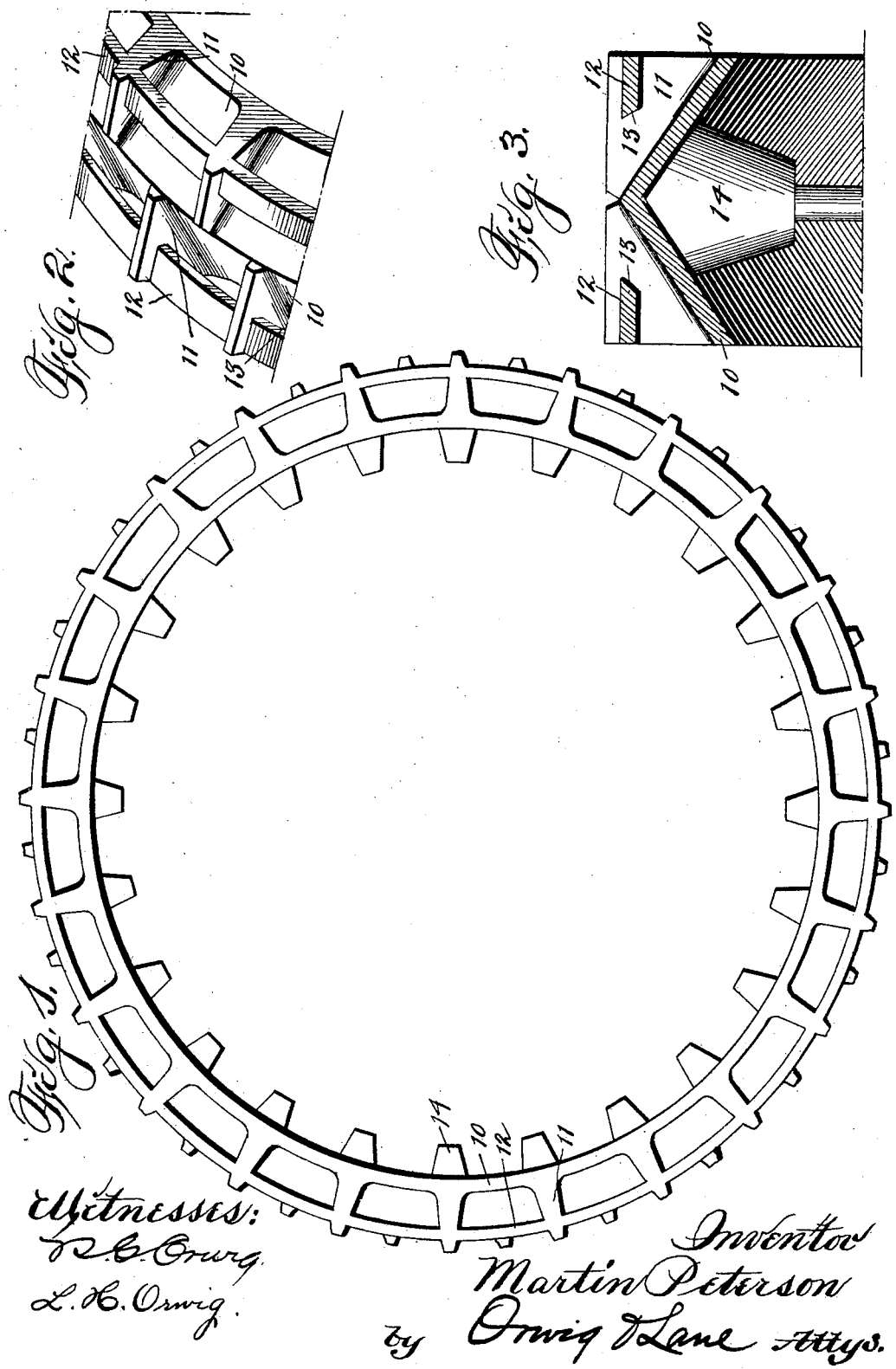

UNITED STATES PATENT OFFICE.

MARTIN PETERSON, OF LAURENS, IOWA.

TRACTION-WHEEL.

No. 803,782. Specification of Letters Patent. Patented Nov. 7, 1905.

Application filed December 27, 1904. Serial No. 238,488.

*To all whom it may concern:*

Be it known that I, MARTIN PETERSON, a citizen of the United States, residing at Laurens, in the county of Pocahontas and State of Iowa, have invented a certain new and useful Traction-Wheel, of which the following is a specification.

The objects of my invention are to provide a traction-wheel of simple, durable, and inexpensive construction designed when traveling over soft surfaces to offer a maximum of resistance as required to prevent slipping and to be self-cleaning and also designed when traveling over smooth hard surfaces to furnish a substantially flat tread portion and also to prevent slipping.

My invention consists in the construction, arrangement, and combination of the various parts of the device whereby the objects contemplated are attained, as hereinafter more fully set forth, pointed out in my claim, and illustrated in the accompanying drawings, in which—

Figure 1 shows a side elevation of a complete wheel-rim. Fig. 2 shows a perspective view of a portion of the wheel, and Fig. 3 shows a transverse sectional view through a portion of the wheel.

Referring to the accompanying drawings, I have used the reference-numeral 10 to indicate the tread portion of the wheel-rim. This tread portion is tapered from its center in both directions outwardly and toward the axial line of the wheel. Projecting from the face of the tread portion are the transverse ribs 11. The outer edges of these are substantially flat and parallel with the axis of the wheel. At a point between the inner and outer ends of the transverse ribs 11 I have provided the supplemental tread portions 12. These supplemental tread portions extend completely around the rim. Their outer faces are substantially parallel with the outer faces of the transverse ribs 11. One side edge of each supplemental tread portion is flush with the adjacent side edge of the tread portion 10, and the other side edge of each supplemental tread portion is spaced apart from the center of the tread portion a considerable distance, which distance is substantially the same as the width of the outer face of the supplemental tread portion itself. The adjacent edges of the two supplemental tread portions 12 are inclined at 13 in substantially the same direction as the adjacent portions of the tread 10. On the inner face of the tread 10 are the sockets 14, to which the wheel-spokes may be attached.

In practical use and assuming that the wheel is being driven over relatively soft surfaces the wheel will sink into the surface to such an extent that the transverse ribs 11 will be embedded. Obviously the transverse ribs 11 will prevent the wheel from slipping when driving power is applied thereto, and the inclined faces of the tread portion will cause the wheel to be self-cleaning, as the soft substance over which the wheel is traveling may pass upwardly and outwardly across the inclined faces of the tread portion 10 and between the said inclined faces and the supplemental tread portions 12. By having the adjacent edges of the supplemental tread portions 12 inclined, as shown in Fig. 3, these supplemental tread portions will offer a minimum of resistance to substances passing upwardly and outwardly across the inclined faces of the tread portion 10. Assuming, further, that the traction-wheel is being driven over a relatively hard smooth surface—such, for instance, as ice—the transverse ribs 11 will enter the ice only until the supplemental tread portions 12 engage said substance, thus preventing the wheel from cutting too deeply into the surface and at the same time providing transverse ribs that project beyond the supplemental tread portions. In this way power may be applied to drive the wheel without causing the wheel to slip. Furthermore, the transverse ribs 11 will serve to protect the supplemental tread portions 12 from being broken, as the said ribs project outwardly beyond the said supplemental tread portions.

Having thus described my invention, what I claim, and desire to secure by Letters Patent of the United States therefor, is—

An improved traction-wheel comprising a main tread portion tapered in both directions from its center laterally and toward the axial line of the wheel, transverse ribs formed integral with the tread portion extending from the central line of the tread portion laterally in opposite directions, their outer edges substantially parallel with the axial line of the wheel and spaced apart from the main tread portion of the wheel, those on one side of the tread portion arranged between those of the opposite sides and two supplemental tread portions running around the wheel formed integral with the said transverse ribs, their outer side edges flush with the outer side
5 edges of the ribs, their outer faces spaced apart from the outer faces of the ribs and substantially in line with the outer face of the center of the tread portion and their inner side faces spaced apart a considerable distance from the center of the main tread portion.

MARTIN PETERSON.

Witnesses:
  W. P. HOPKINS,
  W. D. COTTRELL.